United States Patent [19]
Silvestrin et al.

[11] Patent Number: 6,069,583
[45] Date of Patent: May 30, 2000

[54] RECEIVER FOR A NAVIGATION SYSTEM, IN PARTICULAR A SATELLITE NAVIGATION SYSTEM

[75] Inventors: Pierluigi Silvestrin, Oegstgeest, Netherlands; Peter Daly; David Walsh, both of Leeds, United Kingdom; Eric Aardoom, A C Nieuwerkerk a/d IJssel, Netherlands

[73] Assignee: Agence Spatiale Europeene, Paris, France

[21] Appl. No.: 08/984,578

[22] Filed: Dec. 3, 1997

Related U.S. Application Data

[63] Continuation of application No. 08/852,179, May 6, 1997, abandoned.

[51] Int. Cl.[7] .............................. G01S 5/02; H04B 7/185
[52] U.S. Cl. ............................. 342/357.01; 342/357.12; 701/215
[58] Field of Search ................. 342/357.01, 357.06, 342/357.12, 385; 701/213, 215; 455/13.3, 277.1

[56] References Cited

U.S. PATENT DOCUMENTS

| | | |
|---|---|---|
| 4,719,469 | 1/1988 | Beier et al. ............................. 342/434 |
| 5,021,792 | 6/1991 | Hwang . |
| 5,268,695 | 12/1993 | Dentinger et al. ....................... 342/357 |
| 5,325,100 | 6/1994 | Kawasaki et al. ....................... 342/357 |
| 5,347,286 | 9/1994 | Babitch ................................... 342/359 |

FOREIGN PATENT DOCUMENTS

| | | |
|---|---|---|
| 581434 | 2/1994 | European Pat. Off. . |

Primary Examiner—Thomas H. Tarcza
Assistant Examiner—Dao L. Phan
Attorney, Agent, or Firm—Alston & Bird LLP

[57] ABSTRACT

The invention relates to a navigation system receiver comprising at least two antennas, one of which is a "reference" antenna. A multiplexer multiplexes the signals from the antennas, and a first processor situated downstream from the multiplexer delivers at least one navigation parameter on the basis of the signals from the multiplexer. The receiver includes a second processor having an input receiving in continuous manner signals from the reference antenna to deliver at least one reference signal representative of a position parameter of the reference antenna. Processor means process the signals from the multiplexer while taking account of at least one said reference signal.

13 Claims, 7 Drawing Sheets

RECEIVER FOR A NAVIGATION SYSTEM, IN PARTICULAR A SATELLITE NAVIGATION SYSTEM

This application is a continuation of application Ser. No. 08/852,179 filed May 6, 1997 now abandoned.

The present invention relates to a receiver for a navigation system, in particular a satellite navigation system.

BACKGROUND OF THE INVENTION

Receivers are already known that enable the attitude or the pointing direction of a vehicle such as a satellite to be determined by using the signals transmitted by global navigation satellite systems (GNSS), such as the American global positioning system (GPS) and the Russian global orbiting navigation satellite system (GLONASS). Geostationary navigation overlay systems (GNOS) such as the European geostationary navigation overlay system (EGNOS) can also be used.

Receivers are already known that enable the attitude of satellites to be determined from GNSS signals by differential phase measurements, e.g. from the article by V. W. Spinney "Applications of the global positioning system as an attitude reference for near earth uses", published by the Institute of Navigation, Warminster, Pa. USA, April 1976, or from the article by A. K. Brown et al. entitled "Interferometric attitude determination using the global positioning system: a new gyrotheodolyte", published in the proceedings of the 3rd International Geodetic Symposium on Satellite Positioning, held at Las Cruses in the USA in 1982, or indeed from the article by K. M. Joseph et al. entitled "Precision orientation: a new GPS application", published in the report of the International Telemetering Conference held at San Diego, Calif., USA, October 1983.

Determining the attitude of any vehicle (space vehicle, aircraft, ship, etc. . . . ) requires the existence of accurate differential phase measurements of carriers comning from at least two GNSS satellites and received, in general, via a minimum of three non-aligned antennas rigidly mounted on the vehicle. Nevertheless, for two-axis attitude determination, also known as "pointing direction" determination, it is possible to make do with only two antennas.

In addition to knowing simultaneously the position of the receiver and the positions of the transmitters as obtained by tracking and demodulating the GNSS signals, such differential phase measurements allow the receiver to determine the attitude of the vehicle with accuracy that can be better than one minute of arc, under appropriate conditions.

A large amount of research effort has been devoted to minimizing errors relating to attitude determination using GPS, within the constraints arising from the particular architecture used for the receiver.

Two receiver architectures have been developed in detail: parallel architecture, an example of which is given in U.S. Pat. No. 5,185,610 (Texas Instruments); and multiplex architecture as described in U.S. Pat. No. 5,268,695 (Trimble Navigation Ltd.) or indeed in two articles published by Texas Instruments, firstly the article by C. R. Johnson et al. entitled "Applications of a multiplexed GPS user set", published in the Proceedings of the 37th Annual Meeting of the USA Institute of Navigation, 1981, pp. 61 to 77, and secondly the article by R. A. Maher entitled "A comparison of multichannel sequential and multiplex GPS receiver for air navigation", published in Journal of the Institute of Navigation, Vol. 31, No. 2, Summer 1984.

With parallel architecture, measurements are obtained by processing signals via multiple identical channels, each connected to a different antenna. Signals are tracked continuously, thereby obtaining low random noise in the differential carrier phase measurements. However, given that the signals must pass through different analog devices, unknown bias necessarily arises.

In contrast, in multiplex architecture, measurements are obtained using a single channel which is switched periodically between the various antennas. This eliminates the effects of bias, but considerably increases random noise level.

Each of those architectures thus presents drawbacks in terms of results obtained, or in terms of implementation, and these are discussed below.

In parallel architecture as shown in FIG. 1, using four antennas, each of the four antennas is connected to a respective one of four identical processing chains under the control of a digital signal processor (DSP).

In this parallel architecture, the signals received on the various antennas are applied to parallel processing channels, each performing radiofrequency to intermediate frequency (RF/IF) processing, and providing code and carrier tracking loops for at least some of the signals, two being a theoretical minimum, and four GNSS signals generally being processed so as to enable real time position determination. Signals are processed in parallel and independently, but for all the various mixing processes, the reference signals which are applied are derived from the same reference temperature-controlled crystal oscillator TCXO via a frequency synthesizer. If independent reference signals were used, then it would not be possible to perform accurate differential carrier phase measurements, and it would be very difficult to separate real carrier phase differences from the phase drift of each reference signal. In accordance with modern spread-spectrum receiver techniques, Costas loops are used for carrier phase tracking and delay-lock loops (DLL) are used for code phase tracking. On this point, reference can be made in particular to the article by J. J. Spilker entitled "GPS signal structure and performance characteristics", published in the journal Navigation, Vol. 1, 1980.

A parallel architecture receiver has two main drawbacks, namely: hardware complexity; and bias due to propagation along the different lines of the various circuits. Bias is the main cause of loss of accuracy. Each device in the RF/IF chain presents finite group delay and thus gives rise to "line" bias, and in general line bias is not the same for all of the chains. The RF filters and the IF filters contribute not only to the total group delay, but they are also very sensitive to temperature. Although group propagation delays through the RF/IF paths of the different antennas can be matched to some extent and can also be calibrated, mismatching always arises because of temperature variations, radiation, and aging phenomena, which have a direct influence on the accuracy with which attitude is determined. Although on-line recalibration is possible, that significantly increases the complexity of the apparatus.

Finally, the complexity, and thus the cost, of a parallel receiver for determining attitude is comparatively high, given that there must be a separate measurement chain for each antenna. This is a very significant drawback for applications in which volume, mass, and power consumption are of great importance, and in particular on-board a satellites.

Using a multiplex architecture receiver in which the signals output by the various antennas are multiplexed eliminates both problems of line bias and problems of RF interference, because there is only one RF/IF section to which all of the time-multiplexed antenna signals are applied. Multiplexing is performed by means of a fast switch which can easily be implemented with PIN diodes or field-effect transistors. This is shown in FIG. 2.

In a multiplex receiver, the paths of all the signals share a common RF/IF section, such that practically all line bias is eliminated, with the exception of the influence of different lengths of antenna cable. Cross-talk is also eliminated because only one antenna is active at any given time. Multiplex architecture also has the advantage of requiring much less hardware than parallel architecture. This leads to significant savings in terms of volume, mass, power consumption, and cost.

However, antenna-multiplexing receivers also suffer from certain drawbacks. The most significant drawback is represented by loss in tracking performance caused by the fact that the antenna signals are observed only during a certain fraction of time. For example, multiplexing between four antennas can lead to a 6 dB degradation of the signal-to-noise ratio, as shown in the work by J. S. Spilker, entitled "Digital communications by satellite", Prentice Hall, N.J., USA (1977).

In addition, multiplex switching must be performed fast enough to maintain the ability to detect data bit transitions, which take place at 50 Hz in GPS and at 100 Hz in GLONASS. Also, the digital processing circuits must be reinitialized at the beginning of each interval. This implies that the phase of the numerically-controlled oscillator (NCO) used in the code and carrier loops needs to be set to an initial phase value on each occasion, and that the code generator must be initialized in the correct state, thereby greatly complicating the design of the receiver. Furthermore, false lock conditions may occur in the carrier tracking loops as a result of the various sampling and switching rates involved, and they also need to be taken into account.

The basic concept of the present invention is to eliminate, at least for the most part, at least some of the above-specified drawbacks by means of an architecture that combines a continuous receiver chain with a multiplex receiver chain.

OBJECTS AND SUMMARY OF THE INVENTION

To this end, the invention provides a satellite navigation system receiver comprising at least two antennas, one of which is a "reference antenna", a multiplexer for multiplexing signals from the antennas, and a first processor situated downstream from the multiplexer to deliver at least one signal representative of a navigation parameter on the basis of signals from the multiplexer, the receiver including a second processor having an input that receives signals continuously from the reference antenna to deliver at least one reference signal representative of a parameter concerning the position of the reference antenna, and processor means for processing the signals from the multiplexer while taking at least one "reference" signal into account, and for calculating at least one item of navigation data.

In a preferred embodiment, the multiplexer has an input that receives signals from the reference antenna. Advantageously, the switching time allocated by the multiplexer to said input is less than the switching time it allocates to the other inputs.

One of said reference signals may be a data modulation signal, and said processor means may include means for removing said modulation signal present on said signals from the multiplexer device.

One of said reference signals may be a signal representing the Doppler effect associated with the reference antenna and which is produced by a loop filter associated with the second processor, and said processor means may include means responsive to said signal representing the Doppler effect to control a numerically-controlled oscillator forming a portion of the first processor, said oscillator also being controlled by a signal representing the Doppler effect associated with the antennas whose signals are multiplexed and which is produced by a loop filter associated with the first processor.

Since the loop filters are digital filters, they are generally functionally a part of the digital processor.

As a result, the phase measurements performed in the second processor are used to reduce the dynamic range of the signals to be processed by the first processor, thereby making it possible, in particular, to simplify the loop filters. Said loop filter of the first processor is preferably a second-order filter. This filter preferably has a passband smaller than 1 Hz, e.g. equal to 0.4 Hz.

In an advantageous variant of the receiver of the invention:

the first processor includes a first RF/IF converter and optionally a first analog-to-digital converter which may then be disposed in cascade downstream from the multiplexer;

the second processor includes a second RF/IF converter and optionally a second analog-to-digital converter which can then be disposed in cascade downstream from the reference antenna; and the receiver includes a frequency synthesizer common to the first and second processors and producing a local oscillator signal and a clock signal which are applied respectively firstly to the first and second RF/IF converters and secondly to the first and second analog-to-digital converters.

For each satellite signal to be processed, the processor may includes a processor block including a reference section forming a portion of the second processor and a slave section forming a portion of the first processor, each said section comprising:

a baseband converter for converting into baseband and also for image frequency rejection;

a numerically-controlled carrier oscillator having an output connected to an input of the baseband converter;

a numerically-controlled code oscillator;

a code generator controlled by said numerically-controlled code oscillator;

a correlator receiving the signal output in baseband from the baseband converter and the early, punctual, and late codes E, P, and L, in accordance with the GPS standard; and;

an accumulator receiving the correlation signals as inputs and generating early, punctual, and late loop input signals as outputs;

the input of the slave section baseband converter is connected to the output of the first analog-to-digital converter;

the input of the reference section baseband converter is connected to the output of the second analog-to-digital converter; and the processor means includes a digital processor receiving the loop control signals generated by the accumulator of the reference section and by the accumulator of the slave section, and generating loop signals for the carrier oscillators and for the code oscillators of the reference section and of the slave section.

In a preferred embodiment, leading to a simplification of the receiver, for each satellite signal to be processed, the receiver includes a processor block including a reference section forming a portion of the second processor, a slave section forming a portion of the first processor, and a section common to the first and second processors;

said common section includes:
  a numerically-controlled carrier oscillator having an output;
  a numerically-controlled code oscillator; and
  a code generator controlled by said numerically-controlled code oscillator and generating early, punctual, and late codes E, P, and L;

said reference section includes:
  a baseband converter for conversion into baseband and for image frequency rejection, said baseband converter having an input connected to the output of the second analog-to-digital converter and an input connected to the output of the numerically-controlled carrier oscillator;
  a correlator receiving the signal output in baseband from the baseband converter together with the early, punctual, and late codes E, P, and L generated by the code generator, and outputting correlation signals; and
  an accumulator receiving the correlation signals as inputs and generating as outputs early, punctual, and late loop control signals;

said slave section includes:
  a baseband converter performing baseband conversion and image frequency rejection, said baseband converter having an input connected to the output of the first analog-to-digital converter, and an input connected to the output of the numerically-controlled carrier oscillator;
  a correlator receiving the signal output in baseband from the baseband converter together with the punctual code P generated by the code generator of the reference section, and outputting a punctual correlation signal; and
  an accumulator receiving the punctual correlation signal as its input and outputting a punctual loop control signal;

and the processor means includes a digital processor receiving the loop control signals generated by the accumulators of the reference section and of the slave section, and generating loop signals for the carrier oscillator and for the code oscillator.

BRIEF DESCRIPTION OF THE DRAWINGS

Other characteristics and advantages of the invention appear on reading the following description given by way of non-limiting example and with reference to the accompanying drawings, in which.

MORE DETAILED DESCRIPTION

Figure 1:
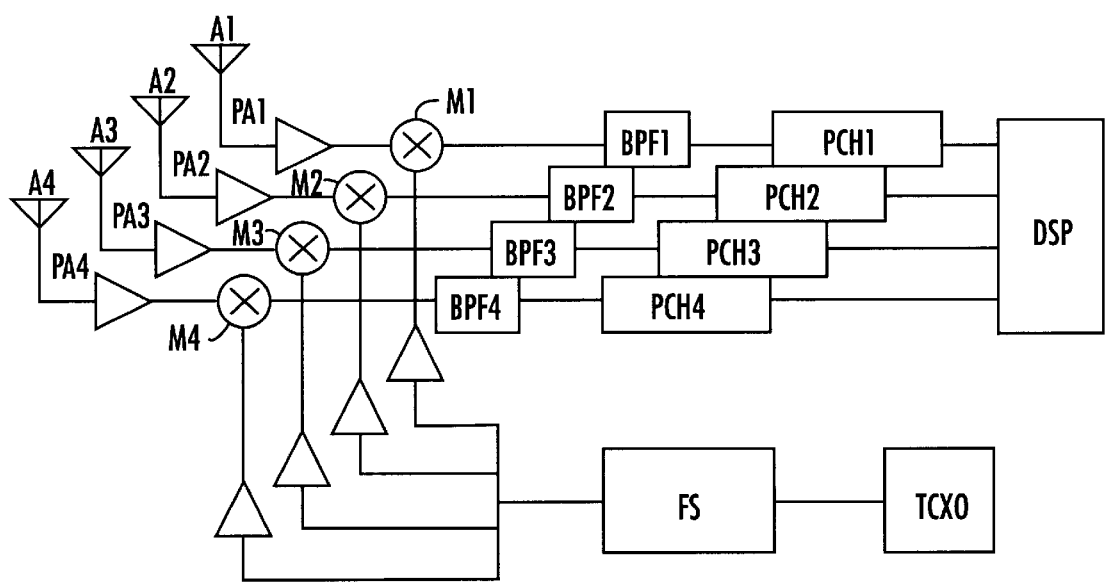
FIG. 1 is a block diagram of prior art parallel architecture.

As shown in FIG. 1, a parallel architecture receiver has a plurality of antennas, e.g. four, referenced $A_1$ to $A_4$, feeding respective preamplifiers $PA_1$ to $PA_4$ whose outputs are applied to respective first inputs of mixers $M_1$ to $M_4$ whose other inputs receive signals delivered by a frequency synthesizer FS under the control of a stable crystal oscillator TCXO. The outputs from the mixers $M_1$ to $M_4$ are applied to respective bandpass filters $BPF_1 \ldots BPF_4$ whose outputs are connected to processing channels $PCH_1 \ldots PCH_4$ controlled by a digital signal processor DSP.

Figure 2:
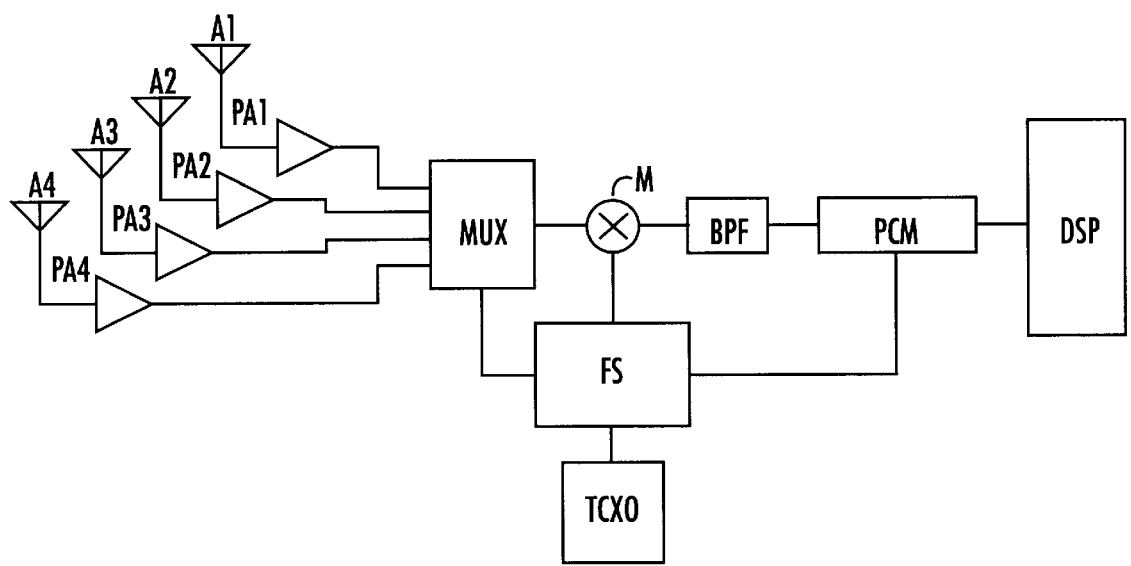
FIG. 2 is a block diagram of prior art multiplex architecture.

In FIG. 2, a multiplex receiver receives output signals from antennas $A_1$ to $A_4$ and applies them to preamplifiers $PA_1$ to $PA_4$ whose outputs are applied to a common multiplexer MUX controlled as is the mixer M by a synthesizer FS itself driven by a stabilized oscillator TCXO. In this case, the digital signal processor DSP operates in time-multiplexed mode using a single bandpass filter BPF and a single processing channel PCH.

The architecture corresponding to the present invention (see FIG. 3) implements a concept that combines a non-switched receiver section that includes a processor DT2 and which is used as a reference channel, together with a receiver section employing antenna signal multiplexing, and which includes a processor DT1. A digital signal processor DSP and a frequency synthesizer FSY drive both processors DT1 and DT2.

The time-continuous section tracks the satellite signals required for attitude determination and provides continuous navigation data as well as carrier and code measurements. These measurements are then used to aid the tracking loops of a number of slave channels which share the same RF/IF stage and which are connected to a set of antennas mounted on the vehicle through a time-multiplexing architecture.

It is important to observe that the antenna signal which is used in the continuous receiver section is preferably also multiplexed in the multiplexed section of the receiver.

The slave channels are processed by the processor DT1 and provide the various differential carrier phase measurements necessary for determining attitude. The tracking loops are assisted by the digital signal processor DSP in a manner similar to that implemented in high-performance dual-frequency receivers, in which tracking at the second frequency $L_2$ is assisted by the more "robust" tracking at the first frequency $L_1$. Such a technique is described in the article by S. Riley et al., entitled "A combined GPS/GLONASS high precision receiver for space applications", published in the Proceedings of the Institute of Navigation, International Meeting on GPS, ION-GPS-95, Palm Springs, Calif. USA, September 1995, and also in the article by T. K. Meehan et al., entitled "The turborogue GPS receiver", published in the Proceedings of the 6th International Geodetic Symposium on Satellite Positioning, Columbus, Ohio, USA, 1992.

Antenna multiplexing on the slave channels eliminates problems of RF line bias and considerably reduces the complexity of the hardware compared with fully parallel architecture. The fact that the slave channels are aided by the continuous reception section of the receiver has the effect that the only signal dynamics observed in the slave channels are those due to the relative dynamics between signals from the master and slave antennas. These dynamics are well-known in the context of attitude determination, given that angular speeds and accelerations are always limited. In space applications, relative accelerations can be estimated as generally being much less than 1 g, which makes them completely negligible from the signal tracking point of view. As a result, the tracking loops of the slave channel can be optimized to provide very accurate differential carrier phase measurements because the carrier processing loops have very narrow passbands which generally make it possible to keep the standard deviation of noise measurement below 1 mm under typical signal conditions.

Figure 3:
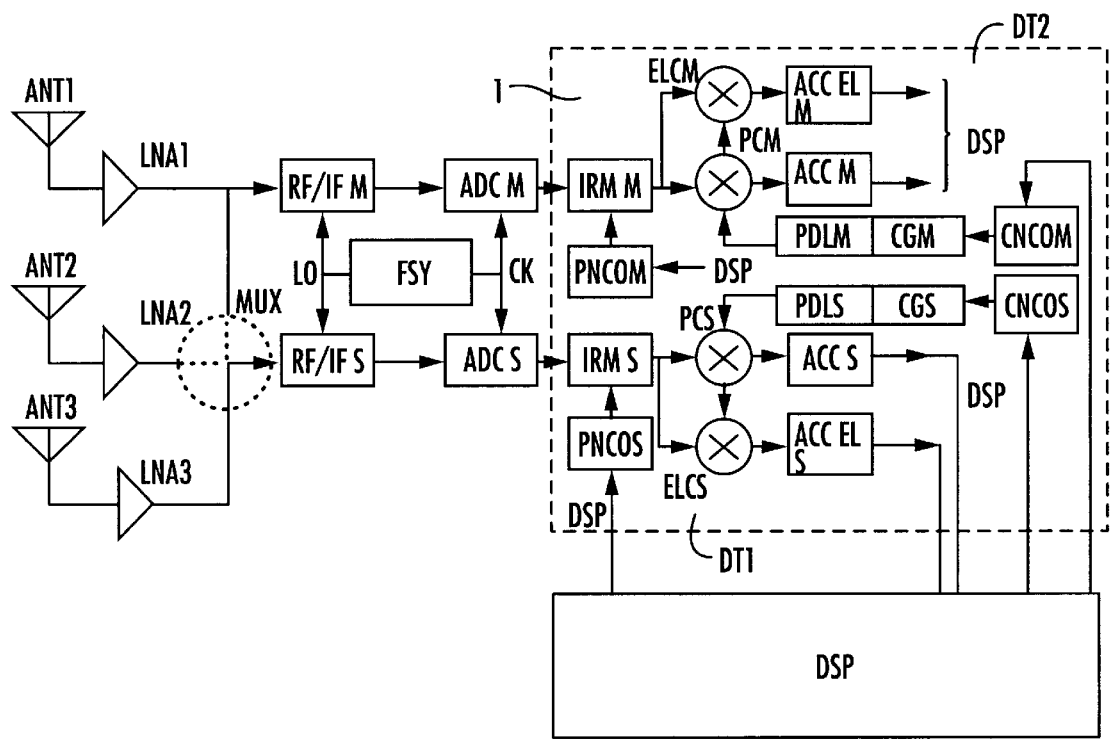
FIG. 3 is a block diagram of architecture for a receiver of the present invention.

With reference now to FIG. 3, the output of a preamplifier $LNA_1$ for signals from a reference antenna $ANT_1$ is applied to the input of a master RF/IF stage RF/IFM whose output is applied to a master analog-to-digital converter ADCM. A multiplexer MUX has its inputs receiving the output signals from the amplifier $LNA_1$ and also from amplifiers $LNA_2$ and $LNA_3$ for slave antennas $ANT_2$ and $ANT_3$. The output from the multiplexer MUX is applied to an input of a slave RF/IF stage RF/IFS whose output is applied to the input of a slave analog-to-digital converter ADCS. A frequency synthesizer FSY controlled by a stable crystal oscillator TCXO produces both a local oscillator signal LO which is applied to each of the master and slave RF/IF intermediate stages RF/IFM and RF/IFS, and a clock signal CK which is applied to each of the converters ADCM and ADCS and which is also used in the master and slave processors which are described in greater detail below.

In the reference or "master" processing chain which processes signals from the antenna $ANT_1$, the letter M is always added to the end of the reference designating a corresponding element, whereas in the slave processor chain, it is the letter S which is added.

There are thus three portions to the diagram of FIG. 3:

the antennas $ANT_{1-3}$ and their associated low noise amplifiers $LNA_{1-3}$;

the signal processor chain for the continuous receiver section comprising devices whose references are marked with an "M"; and the signal processor chain for the multiplexed receiver section comprising the devices whose references are marked with an "S".

In dashed line block 1, the diagram of FIG. 3 includes only processor chains corresponding to one channel, but it will be understood that there may be as many chains as there are satellite signals which need to be tracked for attitude determination. It is mentioned above that the number of signals is at least two, and is generally four. Under such circumstances, there are four blocks that are identical to the dashed line block 1, each being allocated to one of the four above-mentioned signals delivered by the antennas $ANT_{1-3}$, and all under the control of the same digital signal processor DSP.

Figure 4:
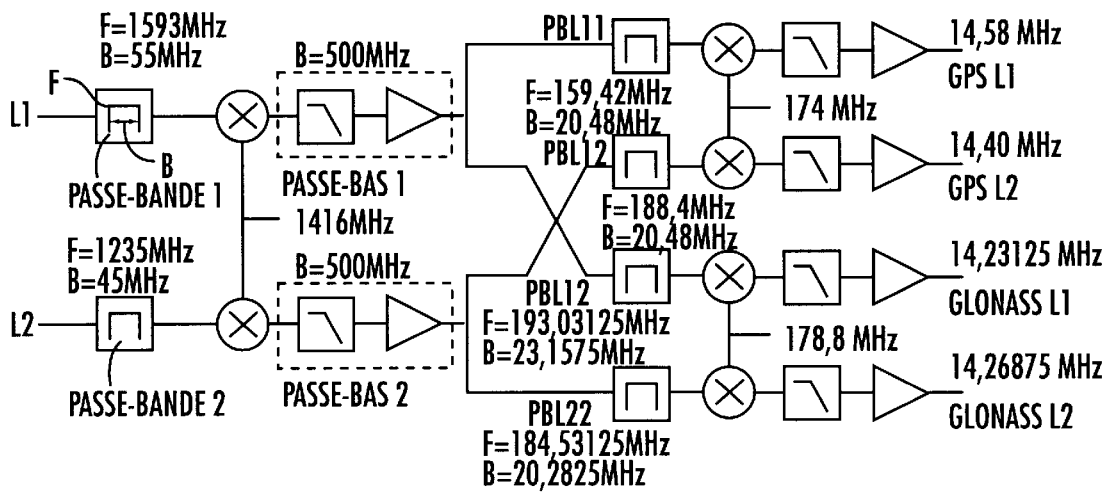
FIG. 4 shows an example of an RF/IF stage suitable for use in the context of the present invention.

The master section includes all of the devices required to implement a time-continuous receiver. The signal is applied to the RF/IF stage RF/IFM where it is amplified, filtered, and converted in one or two steps to an appropriate intermediate frequency. The master and slave RF/IF stages RF/IFM and RF/IFS may be implemented in the manner disclosed in the above-mentioned article by S. Riley et al. "A combined GPS/GLONASS high precision receiver for space applications", published in the Proceedings of the Institute of Navigation International Meeting on GPS, ION-GPS-95, Palm Springs, USA, September 1995. The diagram is given in FIG. 4. It has the feature of being compatible with all GNSS signals. The portion operating at the frequency L2 can be omitted in a receiver of the invention which seeks to determine attitude, but it may nevertheless be useful for solving problems of synchronization ambiguity (on this topic, see U.S. Pat. No. 5,185,610).

The output from the master RF/IFM stage is in-phase and quadrature sampled, and is quantified by the analog-to-digital converter ADCM prior to being applied to a master digital mixer IRMM which performs final conversion to baseband plus image frequency rejection using the output of the numerically controlled carrier oscillator PNCOM as a local oscillator input. The input of this numerically-controlled oscillator PNCOM is controlled in conventional manner by the digital signal processor DSP controlling the loop filter required for closing a conventional Costas loop enabling a suppressed carrier spread spectrum signal to be tracked. The technique used for this purpose is conventional.

The reference signal in baseband is correlated with a replica of the pseudo-random code PN in two correlators reference ELCM and PCM. By way of example, the correlator ELCM may be made up of two correlators, one serving to correlate early code E and the other to correlate late code L. This performs an incoherent digital loop, as described in Chapter 8 of the book entitled "Global positioning systems: theory and applications", by B. W. Parkinson and J. J. Spilker, published by the American Institute of Aeronautics and Astronautics (1995) in which the punctual code P is applied to the correlator PCM and the early and late codes E and L are applied to the correlator ELCM. The code used is the clear/acquisition (C/A) code which has a switching frequency of 1.23 MHz for GPS and of 0.511 MHz for GLONASS. The C/A code generator referenced CGM is clocked by a numerically-controlled code oscillator CNCOM whose input is controlled in conventional manner by the digital signal processor DSP. A three-output programmable delay PDLM is used to produce the early, punctual, and late codes E, P, and L for the delay loop DLL which is looped via the correlator PCM of the code P and the correlator ELCM for the codes E and L. The output signals from the delay loop DLL are obtained from accumulators ACCELM and ACCM whose signals are applied to the processor DSP. These are read by the processor DSP at a relatively slow rate, with typical values being 50 Hz or 100 Hz. The filters of the carrier loop and of the loop DLL are parameterized in the processor DSP. The input of the carrier loop filter is obtained after phase discrimination, also performed by the processor DSP, between the in-phase samples and the quadrature samples which are available at the output of the accumulator ACCM.

The function of the above-mentioned accumulators is to filter the correlated signal components prior to processing in the processor DSP. The accumulator accumulates samples correlated over a period T which is usually equal to the period of the C/A code (1 ms), however this period T may be increased to as much as 20 ms in order to increase loop tracking performance. The data rate at the outputs from the accumulators is thus much less than their input data rates. For example, the input may be at 28 MHz, corresponding to the operating frequency of the digital multiplexers preceding the accumulators, and the output data rate may be 100 Hz in acquisition mode and 1 kHz in tracking mode. The totals from the accumulators are stored and are picked up by the processor DSP. For more information, reference may be made to Chapter 8 of the work "Global positioning systems: theory and applications" by B. W. Parkinson and J. J. Spilker, published by the American Institute of Aeronautics and Astronautics (1995).

The input signal to the slave receiver section is obtained by the multiplexer MUX periodically sampling each antenna output. The signal is then applied to a slave RF/IF stage RF/IFS and to a sampling chain which is identical to that of the reference receiver section and which shares the same local oscillator and clock signals LO and CK delivered by the frequency synchronizer FSY. These signals, and also the reference clocks for the numerically-controlled oscillators PNCOM, CNCOM, PNCOS, and CNCOS are produced in coherent manner by said frequency synthesizer FSY under the control of a stable crystal oscillator.

The processing chain implemented in the slave section is similar to that in the reference receiver section, but differs in that the carrier tracking loop and the code tracking loop in the slave chain can now be assisted by the tracking loops in the reference chain which continuously process signals coming from the reference antenna $ANT_1$. In accordance with the invention, the slave tracking loops are designed on the basis of relative dynamics which are induced solely by attitude movements and not on the basis of total signal dynamics. The loops can thus be of lower order than they could be in the absence of such assistance, and the same applies to the passbands.

It will be observed that in the context of the present invention, correlations can be performed in analogous manner, with analog-to-digital conversion then taking place downstream from the correlators.

After the initial signal acquisition stage, all of the navigation data and of the observable data is available at the output from the reference receiver section. This section operates without the loss of performance that is encountered in a multiplexed receiver.

In particular, the time positions of data transitions and the real value of data modulation (at 50 Hz for GPS and 100 Hz for GLONASS) are determined in the reference section and are made available to the slave channels. As a result, the demodulated data bits and the time positions thereof can be used for eliminating data modulation from correlation measurements performed in the slave channels. An important consequence is that the time positions at which the antennas are switched during multiplexing in the slave section can be chosen in a manner that is completely independent of the data transition rate, thereby making it possible to switch the antennas slowly, e.g. in the range 10 Hz to 50 Hz, which in turn reduces the work load on the processor DSP. This is a considerable advantage compared with the previously-known architectures of the multiplex type in which the multiplexed reference channel needed to be initialized at the beginning of each new interval. In that case, the state of the channel in question needed to be predicted by the receiver software, and the hardware needed to contain elements enabling said initial state to be initialized on each occasion, thereby making both the hardware and the software more complicated. It will thus be understood that the original architecture of the present invention associating antenna signal multiplexing with continuous tracking of one antenna signal provides an important advantage while avoiding making the apparatus more complicated.

In the event of perfect reference carrier tracking, the slave channel carrier phase measurements provide the carrier phase differences between the reference antenna and the slave antennas, ignoring differential path delays between the reference and slave channels. However, in practice, any transients and steady state phase errors that the reference carrier tracking loop is unable to track also disturb differential phase measurements. Steady state tracking errors are eliminated completely only when carrier phase differences in the slave section are taken into account. That is why the reference antenna signal is preferably multiplexed with the signals from the other antennas to produce signals in the slave section. This also means that the phase measurements of the master or reference section are not used when determining attitude, but are used only for removing data modulation and signal dynamics (which are caused by vehicle motion and by propagation effects) from the slave channel observations.

The transients generated in the carrier tracking loop of the reference channel during acquisition nevertheless propagate into the differential slave channel measurements. These transients can be attenuated by observing the output of the phase discriminator which gives an indication of the instantaneous tracking error. This tracking error should not exceed the linear region of the discriminator. In practice, transients will occur only during initial signal acquisition so they do not affect attitude measurement performance under operational conditions.

Reference antenna carrier phase measurement can be performed by the master section, but using two RF/IF units, one in the master section and the other in the slave section would give rise to line bias. Given that drift in such error during a switching period is negligible, such error can be considered as being constant and can be eliminated completely by differentiating phase differences. In practice, the receiver is capable of estimating said error directly because the master antenna preferably also serves as a slave antenna during a certain switching time. This switching time can be matched to the expected drift in the bias so as to maximize the switching time allocated to the other two antennas, and more generally to the other antennas, thereby enabling measurement accuracy to be increased. In other words, the multiplexing time can be shorter for the signals from the master antenna than for the signals from the slave antennas, and in some cases there is no need to sample the master antenna during every multiplexing cycle.

The assistance given by the master receiver tracking loops to the tracking loops of the slave receiver can be performed in the manner described below. This function can be performed entirely by the digital signal processor DSP in which the delay loops DLL are closed by periodically reading the outputs of the accumulators ACCELM, ACCELS, ACCM, and ACCS, e.g. at a nominal frequency of 100 Hz.

The phase error is initially determined by using a table in which an arc tangent function is implemented (phase discrimination function) and by computing the new parameters for each of the numerically-controlled oscillators PNCOM, PNCOS, CNCOM, and CNCOS. For the reference loop, once in a stable state, i.e. after the signals have been acquired, the carrier tracking loops are closed by means of third-order filters. These filters are of variable gain that can be parameterized, thereby enabling the passband of the closed loop to be modified, if necessary. In the stabilized state, the passband is nominally 10 Hz, but it may be increased to 100 Hz, e.g. during the initial data-acquisition step.

The navigation data is demodulated by an algorithm for detecting rising fronts which operates by detecting the output from the in-phase correlator. The apparatus is synchronized with the rising fronts, thereby enabling the work load on the processor DSP to be reduced.

The slave tracking loops take advantage of the operation of the reference section in two different ways. Firstly, data demodulation need not be performed, given that information from the reference section is available and can be used for removing the modulation from the slave signal data. This is a major advantage given that the length of one bit, which is 20 ms for GPS, normally defines the upper limit for integration time, i.e. the number of I and Q samples that can be accumulated at the output from the correlator. Increasing the integration time increases the signal/noise ratio and thus increases measurement accuracy. This technique is generally known as "data stripping" or as "data bit removal".

A second major aspect is that the outputs from the reference loop filters provide a Doppler estimate and a Doppler ratio estimate at the place of use. Doppler and Doppler ratio are generally determined by:

1) the relative movement between the transmitter and reference receiver antennas (motion dynamics);

2) propagation phenomena in the medium (ionosphere dynamics); and 3) relative motion between the master and slave antennas (attitude dynamics).

If the Doppler and Doppler ratio estimates provided by the reference loop filters are used to control the numerically-controlled oscillators PNCOS and CNCOS of the slave receiver, then the slave loop filters need to control the numerically-controlled oscillators PNCOS and CNCOS only for the purpose of residual phase tracking and code error tracking, i.e. for tracking variations due to above-mentioned point 3, i.e. the relative motion between the master and slave antennas. The inputs to the numerically-controlled oscillators PNCOS and CNCOS are thus the sum of the Doppler and Doppler ratio estimates from the reference loop filters and the outputs from the slave loop filters.

Given that the relative motion between the master and slave antennas is characterized by very small dynamics (at least for a satellite where angular accelerations are always less than 10 milli-radians per second squared), low order slave loop filters, and more importantly still, narrow passband filters for the closed loops can be used in the slave receiver. In practice, it is possible to make do with a second-order loop filter for the carrier tracking loop having a closed loop passband that is less than or equal to 1 Hz, e.g. lying in the range 0.1 Hz to 1 Hz. For example, a typical passband of 0.4 Hz reduces the carrier phase measurement noise by a factor of 5 compared with a passband of 10 Hz, given that the noise standard deviation is proportional to the square-root of the closed loop passband for given signal-to-noise ratio.

The receiver may use the following filters which are based on the theory disclosed in the article by S. A. Stephens et al. entitled "Controlled-root formulation for digital phase-locked loop", published in IEEE Transactions on Aerospace and Electronic Systems, Vol. 31, No. 1, January 1995.

It satisfies the formula:

$$\hat{f} = \frac{1}{T}\left[K_1\phi_{n-1} + K_2\sum_{i=1}^{n-1}\phi_i + K_3\sum_{i=1}^{n-1}\sum_{j=1}^{i}\phi_j\right]$$

φ the output of the discriminator;

$\hat{f}$ is the estimated frequency;

T is the integration period;

$K_1$, $K_2$, and $K_3$ are the coefficients of the filter ($K_3$=0 for a filter of order 2).

A filter of order 3 is used in the main filter (Costas loop).

Filters usable in the context of the present invention are specified below by way of example.

| Order | Passband | T (ms) | $K_1$ | $K_2$ | $K_3$ |
|---|---|---|---|---|---|
| 3 | 50/20/10 | 2/5/10 | 0.1741 | 0.01313 | 3.585e-4 |
| 2 | 10 | 10 | 0.1911 | 0.01305 | — |
| 2 | 1 | 10 | 0.3003 | 2.344e-4 | — |

Figure 5:
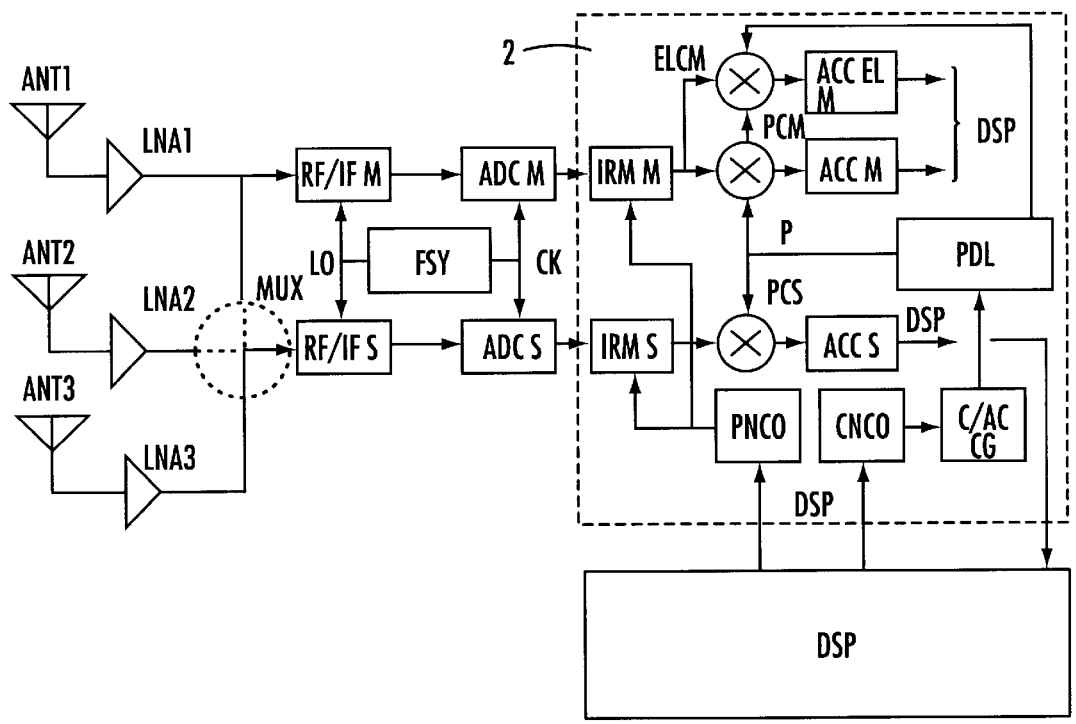
FIG. 5 is a block diagram of a preferred embodiment of a receiver of the present invention.

FIG. 5 shows a preferred embodiment of the invention in which the architecture makes it possible to simplify both hardware and software, with the block(s) 2 in dashed outline in FIG. 5 being implemented instead of the block(s) 1 in dashed outline in FIG. 3.

This concept operates providing the distance between the master and slave antennas is much smaller than the correlation distance C/A. Given that the correlation distance is 586 meters (m) in the GPS system and twice that in the GLONASS system, and given that the base lines between antennas on a satellite are a few meters at most, this condition is well satisfied. The concept is the same as that described above, with the exception that the numerically-controlled oscillators both for the carrier and for the code have been eliminated in the slave section and the signals applied to the image rejection mixer of the slave receiver IRMS and to the slave punctual correlation PCS are exactly the same as those which are applied to the corresponding master circuits IRMM and PCM. The slave signal in baseband is decorrelated in the correlator FPC and the output is accumulated in the circuit ACCS. The output from this accumulator is read periodically by the digital processor DSP, but it is not used for closing the tracking loops, thereby simplifying the software. A phase measurement is obtained from the in-phase and quadrature signals available at the output of the accumulator, by means of a phase discriminator such as an arc-tangent discriminator controlled by the software of the processor DSP.

In other words, the following, circuits are implemented both in FIG. 3 and in FIG. 5: $LNA_{1-3}$, RF/IFM, RF/IFS, FSY, ADCM, ADCS, IRMM, IRMS, PCM, PCS, ACCM, and ACCS. The following circuits are common to the master section and to the slave section: ELCM, ACCELM, the programmable delay line PDL, the C/A code generator CG, and the numerically-controlled oscillators PNCO and CNCO. This leads to the elimination of an accumulator (ACCELS), of a correlator (ELCS), of a C/A code generator, of a programmable delay line, of a numerically-controlled carrier oscillator, and of a numerically-controlled code oscillator.

Under nominal tracking conditions, i.e. after the signal has been acquired, and given the small separation of the antennas, the correlation between the slave antennas and the reference punctual code gives rise to a negligible deterioration of signal-to-noise ratio. As a result, the carrier phase measurements performed by the multiplexed slave section continue to be of good quality and the noise standard deviation thereof is determined by the characteristics of the Costas loop in the reference section. It is important to observe that although reference carrier tracking is performed with a closed loop and the numerically-controlled oscillator NCO of the carrier is controlled so as to be in phase with the input signal of the reference chain, the outputs from the slave accumulators of the various blocks 2 are offset in phase in proportion to the offset between the slave antenna and the master antenna. This concept, which is implemented in all attitude receivers (see in particular above-mentioned U.S. Pat. No. 5,185,610 or above-mentioned U.S. Pat. No. 5,268, 695), simultaneously reduces both hardware and software complexity, given that it removes the need for a specific carrier tracking loop and for components such as early/late correlators and accumulators, and numerically controlled carrier and code oscillators in the slave channels, without having significant influence on the performance obtained.

Figure 6A:
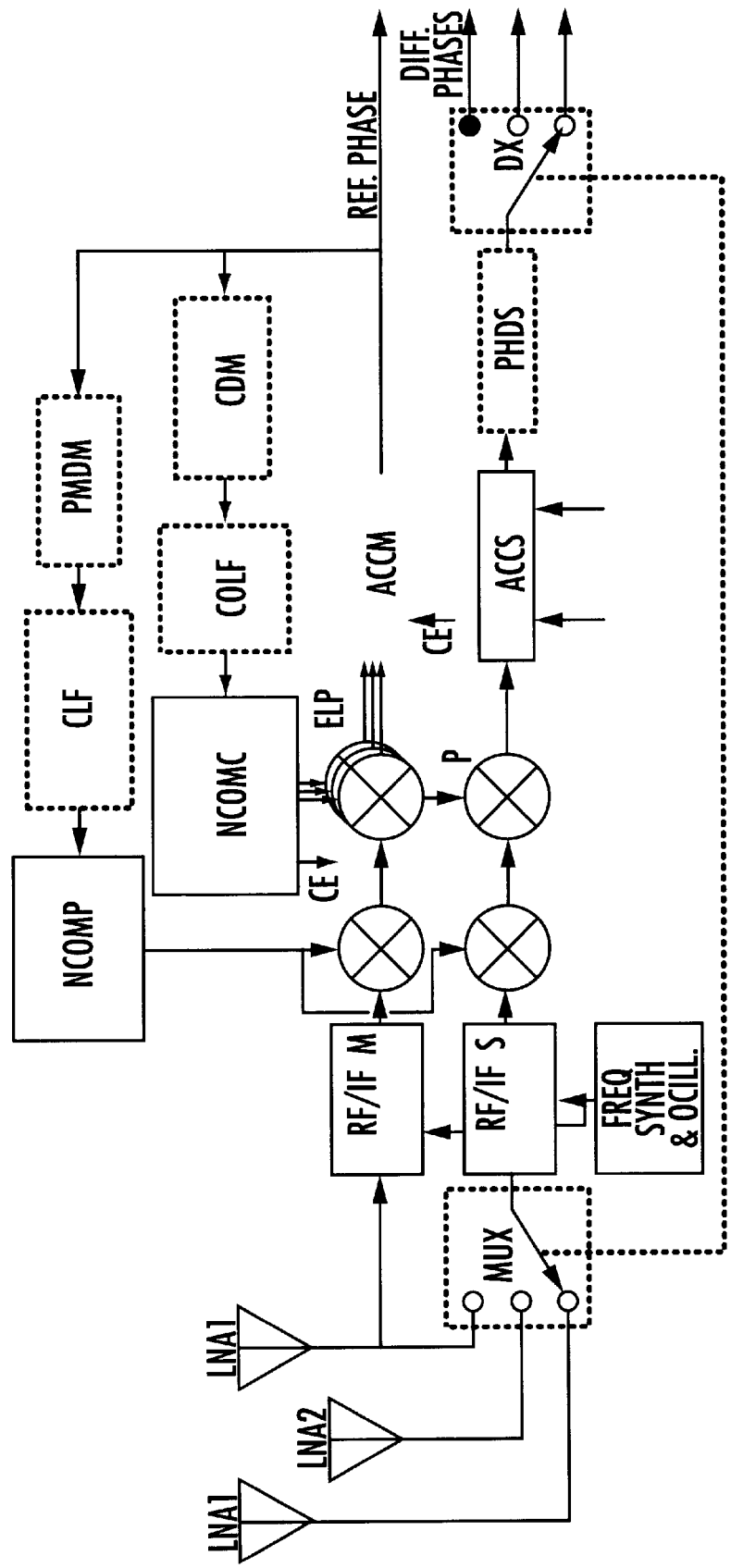
FIG. 6a shows a preferred variant embodiment of the accumulators, in association with a timing diagram of FIG. 6b.

In the embodiment shown in FIG. 6a, the accumulators (or correlators) of the slave section of the receiver are modified so as to minimize or eliminate losses of correlation due to switching in the slave section of the receiver.

Figure 6B:
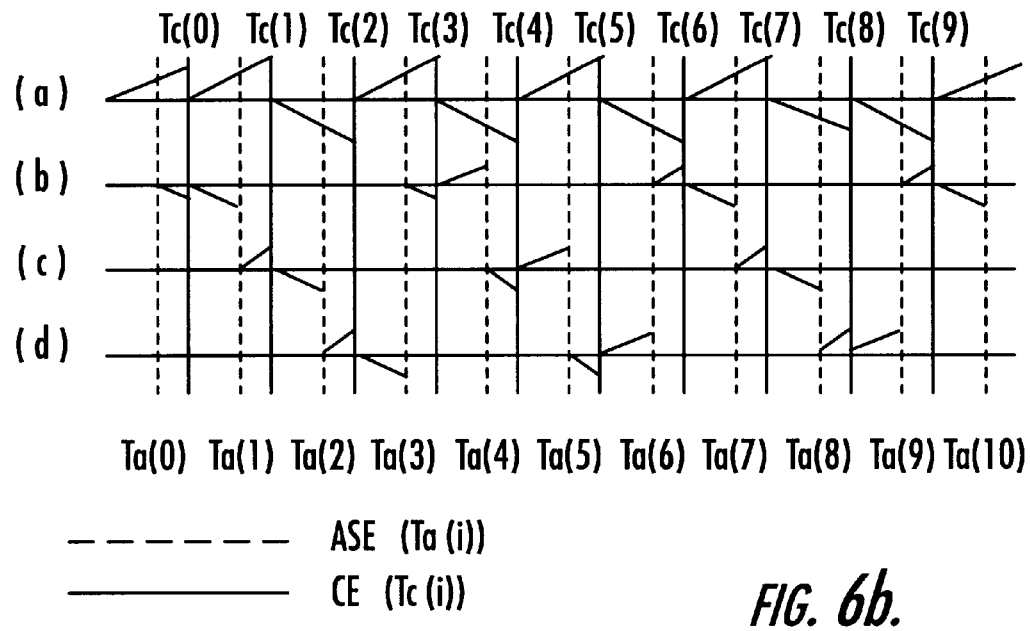
FIG. 6c is a timing diagram showing how sign inversion is corrected in the correlated values.

A first modification consists in reading and in reinitializing the accumulators by means of two independent signals: the code element signal CE, and the antenna switching element signal ASE, whereas conventionally such reinitialization is performed using the signal CE. The code element signal CE thus reinitializes the accumulators of the master and slave channels, and interrupts the processor DSP which then reads all of the values, while the code element signal ASE serves to reinitialize the accumulators in the slave channel(s) only. This is shown in FIG. 6b where the antenna switching rate and the code element rate CE are assumed to be equal, but it is recalled that these two rates can be selected entirely independently of each other.

The signal a represents the output from the phase correlator of the reference channel, and the signals b to d represent the outputs from the accumulators.

In FIG. 6a, it can be seen that the accumulators ACCM of the master section receive the signal CE and the accumulators ACCS of the slave section receive both the signals CE and the above-mentioned signal ASE. The output signals of the accumulators ACCS are delivered to a phase discriminator PHDS and they are directed by a switching circuit DX to the outputs representing the differential phases by switching taking place synchronously with the switching of the multiplexer MUX.

The output signals from the master accumulators ACCM which represent the reference phase, are injected into a code discriminator CDM and a phase discriminator PHDM. The output from the discriminator PHDM is applied to a loop filter CLF which itself feeds a numerically-controlled oscillator NCOMP which produces a replica of the carrier that is used as a local oscillator for the master module and for the slave module. Via a loop filter COLF, the discriminator CDM feeds a numerically-controlled oscillator NCOMC which serves to generate the C/A code (E, L, P) and the CE code.

Figure 6C:
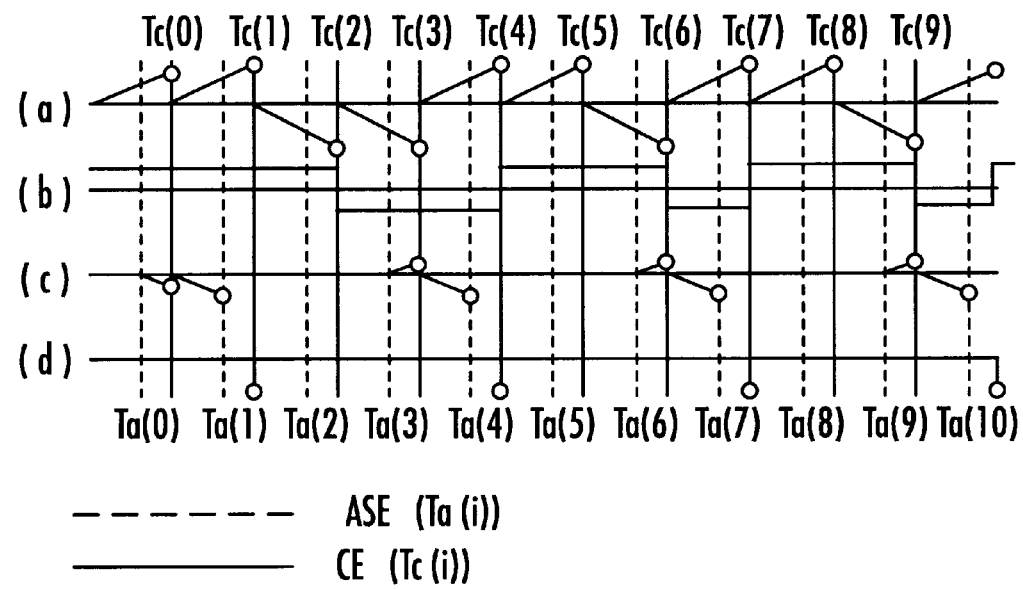

The second characteristic consists in data inversion processing ("data stripping") serving to eliminate reading of sign inversions from the accumulators (or correlators) which may have been produced by the signal being modulated by navigation data. This is shown in FIG. 6c. Assuming that the reference channel is programmed to perform correlation on a full period of one bit, the data bits are detected during activation of the switching instant signal CE. The partial correlation values are obtained in pairs, each sample being modulated by a different data bit. Once the signs of consecutive data bits have been determined by the reference section, they can be used by the slave section for correcting a pair of partial correlation values. The values then have the same sign and can be summed to form a single correlation sample having maximum signal energy, from which an estimate can be extracted for the carrier phase. FIG. 6c shows the reference correlation values (a), the detected data bits (b), the correlation values from the slave channel (c), and the final correlation value (d).

What is claimed is:

1. A satellite navigation system receiver comprising at least two antennas, one of which is a reference antenna, a multiplexer for multiplexing signals from the antennas, a first processor operatively connected to the multiplexer to deliver at least one signal representative of a navigation parameter on the basis of signals from the multiplexer, a second processor having an input that receives signals continuously from the reference antenna to deliver at least one reference signal representative of a parameter concerning the position of the reference antenna, and processor means for processing the signals from the multiplexer while also taking into account said at least one reference signal and for calculating at least one item of navigation data.

2. A receiver according to claim 1, wherein the multiplexer has an input that receives signals from the reference antenna.

3. A receiver according to claim 2, wherein a multiplexer allocates a switching time to said input receiving the signal from the reference antenna which is shorter than the switching time allocated by the multiplexer to its other inputs receiving signals from other antennas.

4. A receiver according to claim 1, wherein:
the first processor includes a first RF/IF converter operatively associated with the multiplexer, and a first analog-to-digital converter;
the second processor includes a second RF/IF converter operatively associated with the reference antenna, and a second analog-to-digital converter; and
the receiver includes a frequency synthesizer common to the first and second processors and producing a local oscillator signal and a clock signal which are applied respectively firstly to at least the first and second RF/IF converters and to at least the first and second analog-to-digital converters.

5. A receiver according to claim 4, wherein the first and second analog-to-digital converters are in cascade with the first and second processors respectively.

6. A receiver according to claim 1, wherein one of said reference signals is a data modulation signal, and wherein said processor means includes means for removing said modulation signal present on said signals from the multiplexer device.

7. A receiver according to claim 1, wherein one of said reference signals is a signal representing the Doppler effect associated with the reference antenna and which is produced by a loop filter associated with the second processor; and wherein said processor means include means responsive to said signal representing the Doppler effect to control a numerically-controlled oscillator forming a portion of the first processor, said oscillator also being controlled by a signal representing the Doppler effect associated with the antennas whose signals are multiplexed and which is produced by a loop filter associated with the first processor.

8. A receiver according to claim 7, wherein said loop filter of the first processor is a second order filter.

9. A receiver according to claim 8, wherein said loop filter of the first processor has a passband of less than 1 Hz.

10. A receiver according to claim 1, wherein the first processor includes at least one accumulator that is reinitialized both by a code instant signal and by an antenna switching instant signal, and wherein the second processor includes at least one accumulator reinitialized by said code instant signal.

11. A receiver according to claim 1, wherein the second processor includes at least one accumulator which is associated with a circuit for determining signs of consecutive data bits, and wherein the first processor includes at least one accumulator associated with a circuit for correcting partial correlation values as a function of the signs of consecutive data bits in such a manner as to obtain identical sign values.

12. A satellite navigation system receiver comprising at least two antennas, one of which is a reference antenna, a multiplexer for multiplexing signals from the antennas; a first processor operatively associated with said multiplexer to deliver at least one signal representative of a navigation parameter on the basis of signals from the multiplexer, the first processor including a first RF/IF converter operatively associated with the multiplexer and a first analog-to-digital converter; a second processor having an input that receives signals continuously from the reference antenna to deliver at least one reference signal representative of a parameter concerning the position of the reference antenna, the second processor including a second RF/IF converter operatively associated with the reference antenna and a second analog-to-digital converter; a frequency synthesizer common to the first and second processors and producing a local oscillator signal and a clock signal which are applied respectively firstly to at least the first and second RF/IF converters and to at least the first and second analog-to-digital converters; and processor means for processing the signals from the multiplexer and said at least one reference signal and for calculating at least one item of navigation data, wherein for each satellite signal to be processed, the receiver includes a processor block including a reference section forming a portion of the second processor and a slave section forming a portion of the first processor, each said section comprising:

- a baseband converter for converting into baseband and also for image frequency rejection;
- a numerically-controlled carrier oscillator having an output connected to an input of the baseband converter;
- a numerically-controlled code oscillator;
- a code generator controlled by said numerically-controlled code oscillator and generating early, punctual, and late codes E, P, and L;
- a correlator receiving the signal output in baseband from the baseband converter and the early, punctual, and late codes E, P, and L, as generated by the code generator, and outputting correlation signals; and
- an accumulator receiving the correlation signals as inputs and generating early, punctual, and late loop control signals as outputs;
- the input of the slave section baseband converter is connected to the output of the first analog-to-digital converter;
- the input of the reference section baseband converter is connected to the output of the second analog-to-digital converter; and
- the processor means includes a digital processor receiving the loop control signals generated by the accumulator of the reference section and by the accumulator of the slave section, and generating loop signals for the carrier oscillators and for the code oscillators of the reference section and of the slave section.

13. A satellite navigation system receiver comprising at least two antennas, one of which is a reference antenna; a multiplexer for multiplexing signals from the antennas; a first processor operatively associated with said multiplexer to deliver at least one signal representative of a navigation parameter on the basis of signals from the multiplexer, the first processor including a first RF/IF converter operatively associated with the multiplexer and a first analog-to-digital converter; a second processor having an input that receives signals continuously from the reference antenna to deliver at least one reference signal representative of a parameter concerning the position of the reference antenna, the second processor including a second RF/IF converter operatively associated with the reference antenna and a second analog-to-digital converter; a frequency synthesizer common to the first and second processors and producing a local oscillator signal and a clock signal which are applied respectively firstly to at least the first and second RF/IF converters and to at least the first and second analog-to-digital converters; and processor means for processing the signals from the multiplexer and said at least one reference signal and for calculating at least one item of navigation data, wherein, for each satellite signal to be processed, the receiver includes a processor block including a reference section forming a portion of the second processor, a slave section forming a portion of the first processor, and a section common to the first and second processors, wherein said common section includes:

- a numerically-controlled carrier oscillator having an output;
- a numerically-controlled code oscillator; and
- a code generator controlled by said numerically-controlled code oscillator and generating early, punctual, and late codes E, P, and L;

wherein said reference section includes:
- a baseband converter for conversion into baseband and for image frequency rejection, said baseband converter having an input connected to the output of the second analog-to-digital converter and an input connected to the output of the numerically-controlled carrier oscillator;
- a correlator receiving the signal output in baseband from the baseband converter together with the early, punctual, and late codes E, P, and L generated by the code generator and outputting correlation signals; and
- an accumulator receiving the correlation signals as inputs and generating as outputs early, punctual, and late loop control signals;

wherein said slave section includes:
- a baseband converter performing baseband conversion and image frequency rejection, said baseband converter having an input connected to the output of the first analog-to-digital converter, and an input connected to the output of the numerically-controlled carrier oscillator;
- a correlator receiving the signal output in baseband from the baseband converter together with the punctual code P generated by the code generator of the reference section, and outputting a punctual correlation signal; and
- an accumulator receiving the punctual correlation signal as its input and outputting a punctual loop control signal;
- and wherein the processor means includes a digital processor receiving the loop control signals generated by the accumulators of the reference section and of the slave section, and generating loop signals for the carrier oscillator and for the code oscillator.

* * * * *

UNITED STATES PATENT AND TRADEMARK OFFICE
CERTIFICATE OF CORRECTION

PATENT NO. : 6,069,583
DATED : May 30, 2000
INVENTOR(S) : Silvestrin et al.

It is certified that error appears in the above-identified patent and that said Letters Patent is hereby corrected as shown below:

<u>Title page,</u>
 [73] Assignee, "Europeene" should read -- Europeenne --.

Title page, insert the following:
 -- Foreign Application Priority Data
May 9, 1996    France        96 05778 --.

<u>Column 15,</u>
Line 2, after "antenna", the comma "," should be a semicolon --;--.

Signed and Sealed this

Eighteenth Day of September, 2001

*Attest:*

*Attesting Officer*

NICHOLAS P. GODICI
*Acting Director of the United States Patent and Trademark Office*